United States Patent
Moon et al.

(10) Patent No.: US 9,571,168 B2
(45) Date of Patent: Feb. 14, 2017

(54) DATA TRANSCEIVER DEVICE AND RECEIVING METHOD FOR NEAR FIELD COMMUNICATION

(71) Applicant: SAMSUNG ELECTRONICS CO., LTD., Suwon-si, Gyeonggi-Do (KR)

(72) Inventors: Byeongtaek Moon, Seoul (KR); Jinwoo Kim, Seoul (JP); Junho Kim, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/796,240

(22) Filed: Jul. 10, 2015

(65) Prior Publication Data

US 2016/0028446 A1    Jan. 28, 2016

(30) Foreign Application Priority Data

Jul. 28, 2014 (KR) ........................ 10-2014-0095937

(51) Int. Cl.
*H04B 5/00* (2006.01)
*H04B 5/02* (2006.01)
*H04W 4/00* (2009.01)
*H04B 1/00* (2006.01)

(52) U.S. Cl.
CPC ............. *H04B 5/02* (2013.01); *H04B 5/0031* (2013.01); *H04B 5/0062* (2013.01); *H04W 4/008* (2013.01)

(58) Field of Classification Search
CPC ........ H04W 4/008; H04B 5/02; H04B 5/0031; H04B 5/0062

USPC ................................................ 455/41.1, 41.2
See application file for complete search history.

(56) References Cited

U.S. PATENT DOCUMENTS

| | | |
|---|---|---|
| 4,823,098 A | 4/1989 | DeMuro et al. |
| 8,368,515 B2 | 2/2013 | Kim |
| 8,660,485 B2 | 2/2014 | Burtt |
| 2006/0135071 A1 | 6/2006 | Kim |
| 2010/0321128 A1 | 12/2010 | Merlin |
| 2011/0164704 A1* | 7/2011 | Chiang ................... H03D 1/00 375/320 |
| 2012/0083205 A1* | 4/2012 | Marcu ................. G06K 7/0008 455/41.1 |

FOREIGN PATENT DOCUMENTS

| | | |
|---|---|---|
| JP | 2000-115016 | 4/2000 |
| JP | 2004-310583 | 11/2004 |
| JP | 2005-182614 | 7/2005 |
| JP | 2005-197918 | 7/2005 |
| JP | 2009-260406 | 5/2009 |

* cited by examiner

*Primary Examiner* — Lee Nguyen
(74) *Attorney, Agent, or Firm* — F. Chau & Associates, LLC

(57) ABSTRACT

A data transceiver device for near field communication is provided which includes a matching and filtering circuit connected between an antenna and a transceiver and configured to conduct filtering and impedance matching for a reception signal and a transmission signal. The matching and filtering circuit includes a variable attenuator of which the impedance varies with a frequency so that an attenuation ratio of the reception data is smaller than that of the reception carrier signal.

18 Claims, 11 Drawing Sheets

DATA TRANSCEIVER DEVICE AND RECEIVING METHOD FOR NEAR FIELD COMMUNICATION

CROSS-REFERENCE TO RELATED APPLICATIONS

This application claims priority under 35 U.S.C. §119 to Korean Patent Application No. 10-2014-0095937 filed on Jul. 28, 2014, in the Korean Intellectual Property Office, the disclosure of which is incorporated by reference herein.

BACKGROUND (a) Technical Field

The inventive concepts described herein relate to wireless communications, and more particularly, relate to a data transceiver device for near field communication and a receiving method thereof.

(b) Discussion of Related Art

Radio Frequency Identification (RFID) may involve automatic identification of recognition fields using radio waves. An RFID recognition system may be configured to recognize pre-stored predetermined information wirelessly using radio waves such as ultra-short waves or long waves.

The RFID system may be able to recognize information recorded in a tag via a wireless communication. A reader of the system may receive information stored in the tag via an antenna. The reader may recognize and analyze the received information to obtain information for a product when the tag is affixed to the product.

The RFID system may be configured to be resistant to environmental factors such as snow, rain, dust and magnetic flux, for example. Furthermore, the recognition speed of the system may be fast such that recognition is possible even in transit and at a long distance.

As one of RFID techniques, near field communication (hereinafter, referred to as NFC) conducts contactless data communications within several meters.

Due to low implementation cost and short communication distance, the security of an NFC system may be greater than other wireless protocols.

A general NFC system contains an NFC reader circuit and an NFC card circuit. The NFC reader circuit reads and recognizes data to be transmitted to an external device, and the NFC card circuit provides internal characteristic information to an external reader to function as an NFC card (or, a tag).

During a reader mode referred to as an active mode, the NFC reader circuit acts as an RFID reader and receives data through an antenna. During a card mode referred to as a passive mode, the NFC card circuit acts as an RFID tag.

A signal received through the antenna comprises a reception carrier signal and reception data on the reception carrier signal. When the reception carrier signal is attenuated through a matching and filtering circuit to have a target input range, the reception data is also attenuated.

SUMMARY

According to an exemplary embodiment of the inventive concept, a data transceiver device for near field communication includes an antenna; a transceiver; and a matching and filtering circuit. The transceiver includes a receiver and a transmitter. The receiver is configured to demodulate a reception signal, received through the antenna, including reception data modulated by a reception carrier signal. The transmitter is configured to transmit a transmission signal, obtained by modulating transmission data via a transmission carrier signal, and transmit the transmission signal through the antenna. The matching and filtering circuit is connected between the antenna and the transceiver and configured to perform filtering and impedance matching for the reception signal and the transmission signal. The matching and filtering circuit includes a variable attenuator connected between the receiver and the antenna and configured to vary an attenuation ratio differently with a frequency such that an attenuation ratio of the reception data is smaller than that of the reception carrier signal.

In an exemplary embodiment, the variable attenuator is an analog filter.

In an exemplary embodiment, the variable attenuator includes an inductor and a capacitor.

In an exemplary embodiment, the variable attenuator is an LC filter that includes an inductor and a capacitor connected in parallel between a capacitor and a resistor.

In an exemplary embodiment, an attenuation ratio defined by the capacitor and the resistor is fixed such that an attenuation ratio of the reception data is equal to that of the reception carrier signal.

In an exemplary embodiment, the variable attenuator is an LC filter that includes an inductor and a capacitor connected in series between a node and a ground voltage, where the node is connected between a capacitor and a resistor.

In an exemplary embodiment, the data transceiver device uses 13.56 MHz as a frequency band.

In an exemplary embodiment, the data transceiver device is included in a mobile terminal.

In an exemplary embodiment, impedance of the variable attenuator varies with a frequency.

In an exemplary embodiment, the variable attenuator is a band stop filter for blocking a frequency band of the reception carrier signal.

According to an exemplary embodiment of the inventive concept, a data transceiver device for near field communication includes an antenna; a transceiver; and a matching and filtering circuit. The transceiver includes a receiver and a transmitter. The receiver is configured to demodulate a reception signal, received through the antenna, including reception data modulated by a reception carrier signal. The transmitter is configured to transmit a transmission signal, obtained by modulating transmission data via a transmission carrier signal, and transmit the transmission signal through the antenna. The matching and filtering circuit is connected between the antenna and the transceiver and is configured to perform filtering and impedance matching for the reception signal and the transmission signal. The matching and filtering circuit includes a first attenuator and a second attenuator. The first attenuator is connected between the receiver and the antenna and is configured to attenuate the reception signal regardless of a frequency. The second attenuator is connected to the first attenuator, the impedance of the second attenuator varying with a frequency such that an attenuation ratio of the reception data is smaller than that of the reception carrier signal.

In an exemplary embodiment, the first attenuator is an RC filter that includes a capacitor and a resistor connected in series between the receiver and the antenna.

In an exemplary embodiment, the second attenuator is an LC filter that includes an inductor and a capacitor connected in parallel between the capacitor and the resistor.

In an exemplary embodiment, the second attenuator is a band stop filter that includes an inductor and a capacitor connected in series between a node and a ground voltage, where the node is connected between a capacitor and a resistor.

In an exemplary embodiment, the band stop filter is a filter that blocks a frequency band of the reception carrier signal and passes the reception data.

According to an exemplary embodiment of the inventive concept, a data transceiver device for near field communication includes an antenna; a transmitter; a receiver; and a variable attenuator. The receiver is configured to demodulate a reception signal, received through the antenna. The reception signal includes reception data modulated by a reception carrier signal. The variable attenuator is connected between the receiver and the antenna and is configured to vary an attenuation ratio differently with a frequency such that an attenuation of the reception data is smaller than that of the reception carrier signal. In an exemplary embodiment, the device includes an EMC filter connected between the transmitter and the antenna, and an RC filter, where a resistor of the RC filter is connected between the variable attenuator and a node of the EMC filter, and a first capacitor of the RC filter is connected between the receiver and the variable attenuator. In an exemplary embodiment, the variable attenuator includes an inductor connected in parallel with a second capacitor between the first capacitor and the resistor. In an exemplary embodiment, the variable attenuator includes an inductor connected in series between a second capacitor and a node, where the node is connected between the first capacitor and the resistor, and the second capacitor is connected to a ground voltage. In an exemplary embodiment, the variable attenuator includes a second capacitor connected in series between a first inductor and a node, and a second inductor connected in parallel with a third capacitor between the node and a ground voltage.

According to an exemplary embodiment of the inventive concept, a reception method of a data transceiver device for near field communication includes installing a matching and filtering circuit including a variable attenuator between an antenna and a receiver; receiving a reception signal, including reception data modulated by a reception carrier signal, through the antenna; when the reception signal is attenuated within a predetermined input range, varying an attenuation ratio differently with a frequency using the variable attenuator such that an attenuation ratio of the reception data is smaller than that of the reception carrier signal; and demodulating the reception data.

In an exemplary embodiment, the reception method further includes attenuating a reception signal received through the antenna using an RC filter, regardless of a frequency.

In an exemplary embodiment, a frequency band of the reception carrier signal is blocked through the variable attenuator.

In an exemplary embodiment, a frequency band of the reception data is set to a band except for a stop band of the variable attenuator.

In an exemplary embodiment, when the variable attenuator is implemented with a band stop filter of which the impedance varies with a frequency, inductance of a filter is adjusted using a control signal.

BRIEF DESCRIPTION OF THE FIGURES

The inventive concept will become apparent from the following description with reference to the following figures, wherein like reference numerals refer to like parts throughout the various figures unless otherwise specified, and wherein.

DETAILED DESCRIPTION

Figure 1:
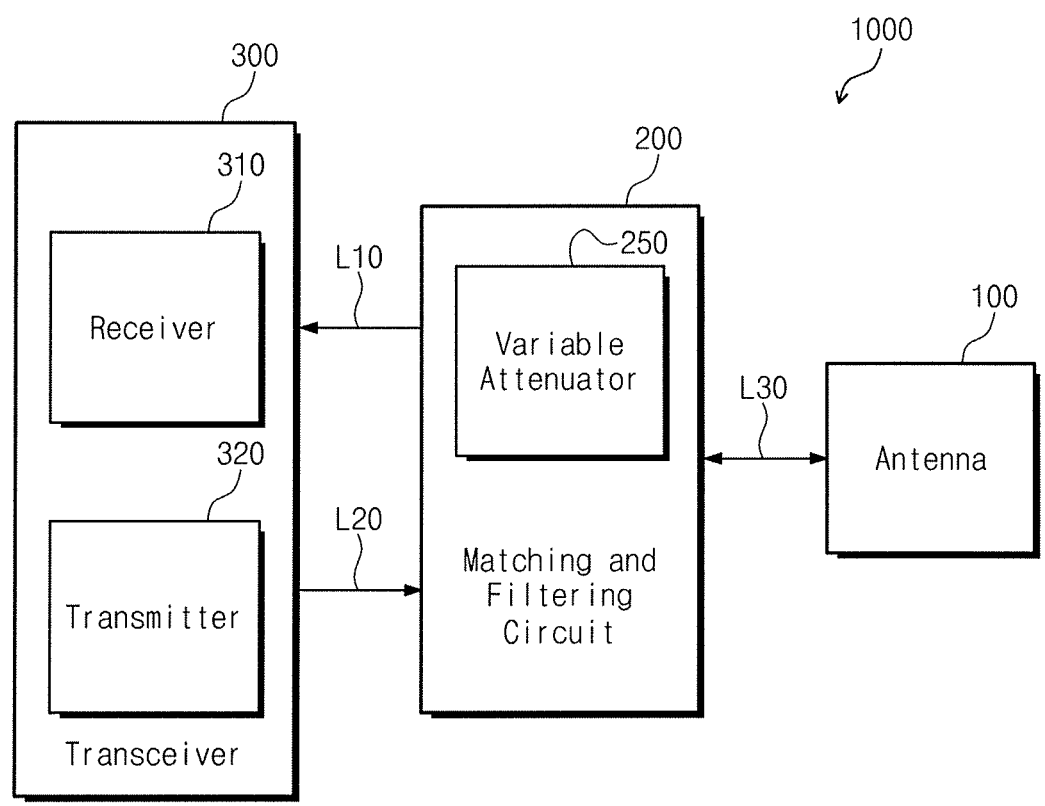
FIG. 1 is a block diagram schematically illustrating a data transceiver device of near field communication, according to an exemplary embodiment of the inventive concept.

Exemplary embodiments of the inventive concept will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Unless otherwise noted, like reference numerals denote like elements throughout the attached drawings and written description, and thus descriptions will not be repeated. In the drawings, the sizes and relative sizes of layers and regions may be exaggerated for clarity.

As used herein, the singular forms "a", "an" and "the" are intended to include the plural forms as well, unless the context clearly indicates otherwise. It will be understood that when an element or layer is referred to as being "on", "connected to", "coupled to", or "adjacent to" another element or layer, it can be directly on, connected, coupled, or adjacent to the other element or layer, or intervening elements or layers may be present. Embodiments disclosed herein may include their complementary embodiments.

FIG. 1 is a block diagram schematically illustrating a data transceiver device of near field communication, according to an exemplary embodiment of the inventive concept.

Referring to FIG. 1, a data transceiver device 1000 for near field communication (NFC) contains an antenna 100, a matching and filtering circuit 200, and a transceiver 300.

The transceiver 300 includes a receiver 310 and a transmitter 320 to function as an NFC reader circuit. The transceiver 300 provides a line L20 with a transmission signal obtained by modulating a transmission carrier signal based on transmission data. The receiver 310 receives and demodulates a reception signal including reception data loaded on a reception carrier signal.

The matching and filtering circuit 200 is connected between the antenna 100 and the transceiver 300 and performs filtering and impedance matching on the reception signal and the transmission signal.

The matching and filtering circuit 200 contains a variable attenuator 250. The variable attenuator 250 is connected between the antenna 100 and the transceiver 300 and differently varies an attenuation ratio according to a frequency such that an attenuation ratio of the reception data becomes smaller than that of the reception carrier signal. In an exemplary embodiment, the variable attenuator is an analog filter.

Thus, an attenuation ratio of the reception data input through a line L30 of the antenna 100 becomes smaller than that of the reception carrier signal by the variable attenuator 250. The attenuated reception signal is applied to the receiver 310 through a line L10. In this case, the receiver 310 may obtain reception data with a sufficient size without increasing a transmission power, thereby increasing a communication distance between the antenna 100 and an external terminal or tag and reducing a transmission power consumed when a magnetic field is radiated through the antenna 100.

Figure 2:
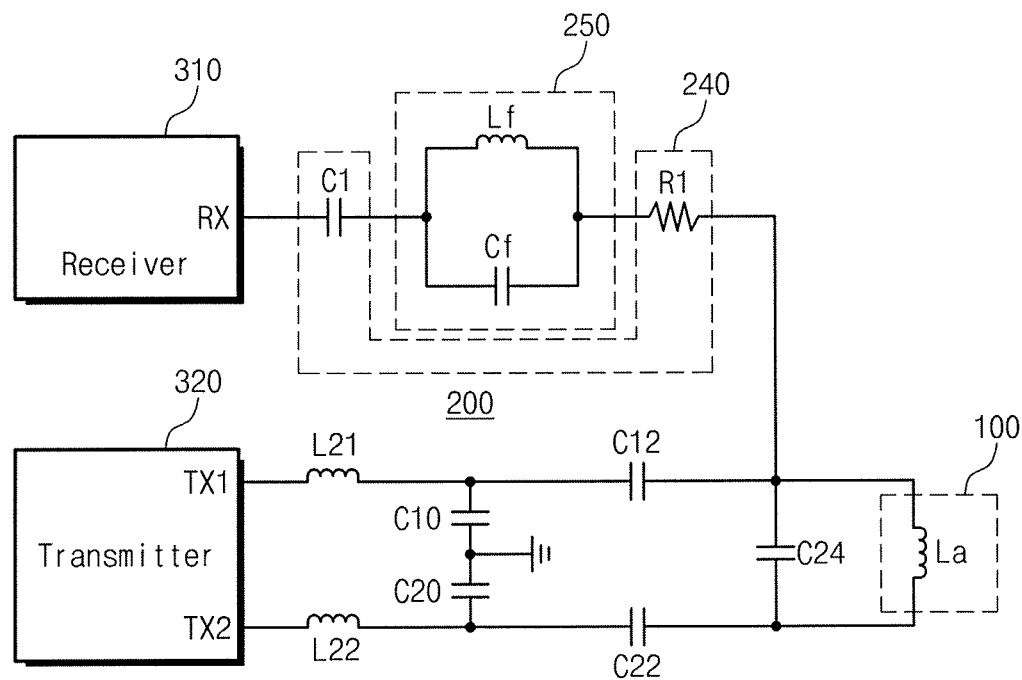
FIG. 2 is a circuit diagram schematically illustrating a matching and filtering circuit shown in FIG. 1, according to an exemplary embodiment of the inventive concept.

FIG. 2 is a circuit diagram schematically illustrating a matching and filtering circuit shown in FIG. 1, according to an exemplary embodiment of the inventive concept.

Referring to FIG. 2, a variable attenuator 250 of a matching and filtering circuit 200 contains an inductor Lf and a capacitor Cf that are connected in parallel between a capacitor C1 and a resistor R1.

The variable attenuator 250 may be implemented with an LC filter where an inductor and capacitor are connected in parallel.

In FIG. 2, if an RC filter formed of the capacitor C1 and the resistor R1 is referred to as a first attenuator 240, the LC filter may be referred to as a second attenuator 250.

The RC filter, which acts as the first attenuator, is connected between a receiver 310 and an antenna 100 and attenuates a reception signal regardless of a frequency.

The LC filter which acts as the second attenuator is connected between the capacitor C1 and the resistor R1 of the first attenuator and varies impedance depending on a frequency. That is, the variable attenuator 250 acts as a band stop filter which makes an attenuation ratio of reception data smaller than that of a reception carrier signal.

Inductors L21 and L22 and capacitors C10 and C20 that are connected between first and second transmission terminals TX1 and TX2 of the transmitter 320 and the antenna 100 act as an electromagnetic compatibility (EMC) filter. Capacitors C12, C22, and C24 that are connected between the first and second transmission terminals TX1 and TX2 of the transmitter 320 and the antenna 100 act as an impedance matching element.

An inductor La is illustrated as an equivalent circuit element of the antenna 100. A loop antenna may include a capacitor as well as the inductor La to form an LC resonator.

During a reader mode, the transmitter 320 radiates a magnetic field with a predetermined transmission power through the antenna 100. An electronic device, RFID tag, or card in the radiated magnetic field is powered by power energy induced from the magnetic field and transmits internally stored data by means of a carrier signal. That is, a reception signal received through the antenna 100 may have the format that the reception data is modulated depending on the reception carrier signal.

Assuming that the amplitude of the reception signal is about 12V and an input range of the receiver 310 is within a scope of about 3V, the reception signal is attenuated to about 3V. The inventive concept is not limited attenuation of a 12V signal to a 3V signal. For example, the attenuation ratio may be a different ratio in alternate embodiments.

A first attenuator 240 attenuates the reception signal. The first attenuator 240 attenuates the reception signal regardless of a frequency. However, an attenuation ratio of an RF carrier signal is equal to that of reception data. That is, since the first attenuator 240 has an attenuation characteristic in which impedance is fixed regardless of a change in a frequency, reception data applied with a lower frequency −fd and an upper frequency +fd, which are spaced apart from a center frequency fc, is also attenuated by 70% when a reception carrier signal applied with a center frequency fc of 13.56 MHz is attenuated by 70%. The lower frequency −fd is lower than the center frequency fc and the upper frequency +fd is higher than the center frequency fc. In an exemplary embodiment, the difference between the center frequency fc and the lower frequency −fd is the same as the difference between the center frequency fc and the upper frequency +fd.

A second attenuator, the variable attenuator 250 attenuates the reception signal attenuated by the first attenuator. In an exemplary embodiment, since the variable attenuator 250 attenuates a reception signal variably based on a frequency, an attenuation ratio of the reception carrier signal is different from that of the reception data. That is, since the second attenuator 250 has an attenuation characteristic in which impedance varies with a change in a frequency, reception data applied with a lower frequency −fd and an upper frequency +fd, which are spaced apart from the center frequency fc, is attenuated by 3% when a reception carrier signal applied with a center frequency fc of 13.56 MHz is attenuated by 30%.

The reason is that impedance is determined depending on the following equation (1).

$$Z = j\omega\omega L / -\omega 2 LC = j\omega\omega L / \{-\omega 2 / \omega C 2\} \quad (1)$$

In the equation 1, 'ω' indicates a varied frequency, 'ωC' indicates a center frequency, 'L' indicates an inductance of the LC filter, and 'C' indicates a capacitance of the LC filter. The inductance and capacitance of the LC filter, which acts as a band stop filter, may be components that vary impedance with a frequency.

In an exemplary embodiment, the variable attenuator 250 is configured such that a signal applied with the center frequency fc experiences relatively great attenuation and a signal applied with a neighboring frequency outside of the center frequency fc experiences relatively small attenuation. Thus, since attenuation about the reception data is not great, the variable attenuator 250 acts as the band stop filter.

According to the above description, during a reader mode, attenuation of the reception data input through a line L30 of the antenna 100 is smaller than that of the reception carrier signal. The receiver 310 obtains reception data with a sufficient size without increasing a transmission power, thereby increasing a communication distance between the antenna 100 and an external terminal or tag and reducing a transmission power consumed when a magnetic field is radiated through the antenna 100.

Figure 3:
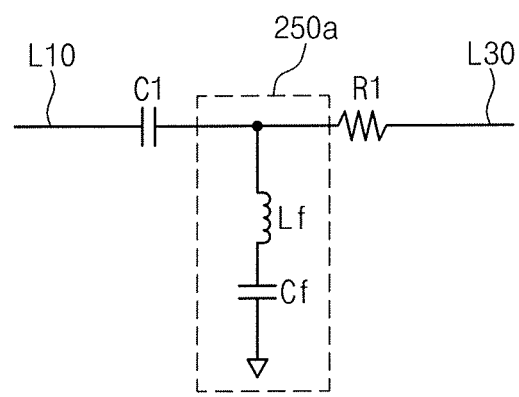
FIG. 3 is a circuit diagram schematically illustrating a variable attenuator shown in FIG. 2, according to an exemplary embodiment of the inventive concept.

FIG. 3 is a circuit diagram schematically illustrating a variable attenuator shown in FIG. 2, according to an exemplary embodiment of the inventive concept.

Referring to FIG. 3, a variable attenuator 250a contains an inductor Lf and a capacitor Cf connected in series between a node and a ground voltage, where the node is connected between a capacitor C1 and a resistor R1.

The variable attenuator 250a may be configured such that a signal applied with a center frequency fc experiences relatively great attenuation and a signal applied with a neighboring frequency outside of the center frequency fc experiences relatively small attenuation. Thus, attenuation of the reception data is not great. The variable attenuator 250 of FIG. 2 may be replaced by the variable attenuator 250a of FIG. 3.

Figure 4:
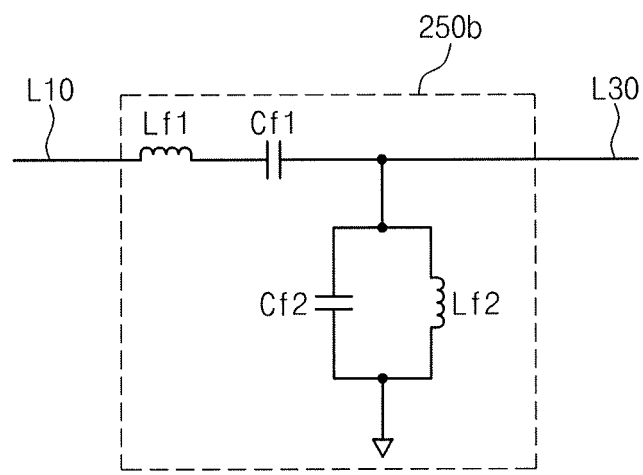
FIG. 4 is a circuit diagram schematically illustrating a variable attenuator shown in FIG. 2, according to an exemplary embodiment of the inventive concept.

FIG. 4 is a circuit diagram schematically illustrating a variable attenuator shown in FIG. 2, according to an exemplary embodiment of the inventive concept.

Referring to FIG. 4, a variable attenuator 250b contains inductors Lf1 and Lf2 and capacitors Cf1 and Cf2. The inductor Lf1 and the capacitor Cf1 are connected in series between a line L10 and a line L30, and the inductor Lf2 and the capacitor Cf2 are connected in parallel between a node and a ground voltage, where the node is connected between capacitor Cf1 and line L30.

In an exemplary embodiment, the variable attenuator 250b has the characteristic that impedance varies with a change in a frequency and may be configured such that a signal applied with the center frequency fc experiences relatively great attenuation and a signal applied with a neighboring frequency outside of the center frequency fc experiences relatively small attenuation. Thus, since attenuation of the reception data is smaller than that of a reception carrier signal, the variable attenuator 250b acts as the band stop filter. The variable attenuator 250 of FIG. 2 may be replaced by the variable attenuator 250b of FIG. 4.

Figure 5:
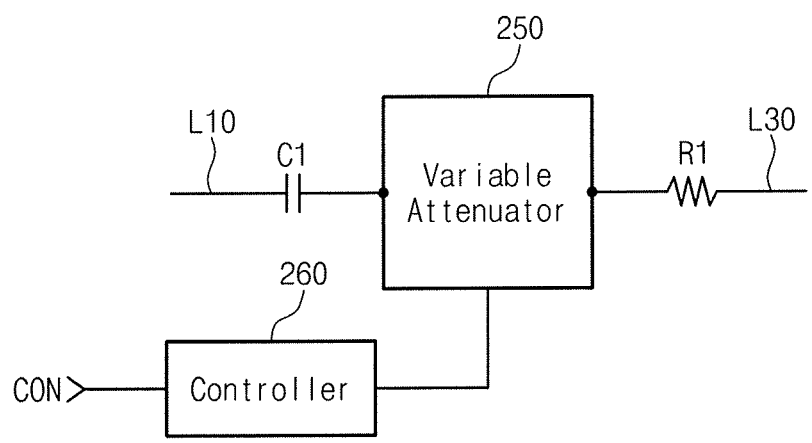
FIG. 5 is a circuit diagram schematically illustrating a variable attenuator shown in FIG. 2, according to a further embodiment of the inventive concept.

FIG. 5 is a circuit diagram schematically illustrating a variable attenuator shown in FIG. 2, according to an exemplary embodiment of the inventive concept.

Referring to FIG. 5, a variable attenuator 250 adjusts a variation in impedance, which varies with a frequency, in response to a control of a controller 260.

The controller 260 adjusts an impedance variation of the variable attenuator 250 in response to a control signal CON. This configuration is useful to adjust an attenuation ratio of the reception data finely. The variable attenuator 250 in FIG. 5 may be replaced with the variable attenuator 250a of FIG. 3 or the variable attenuator 250b of FIG. 4.

Figure 6:
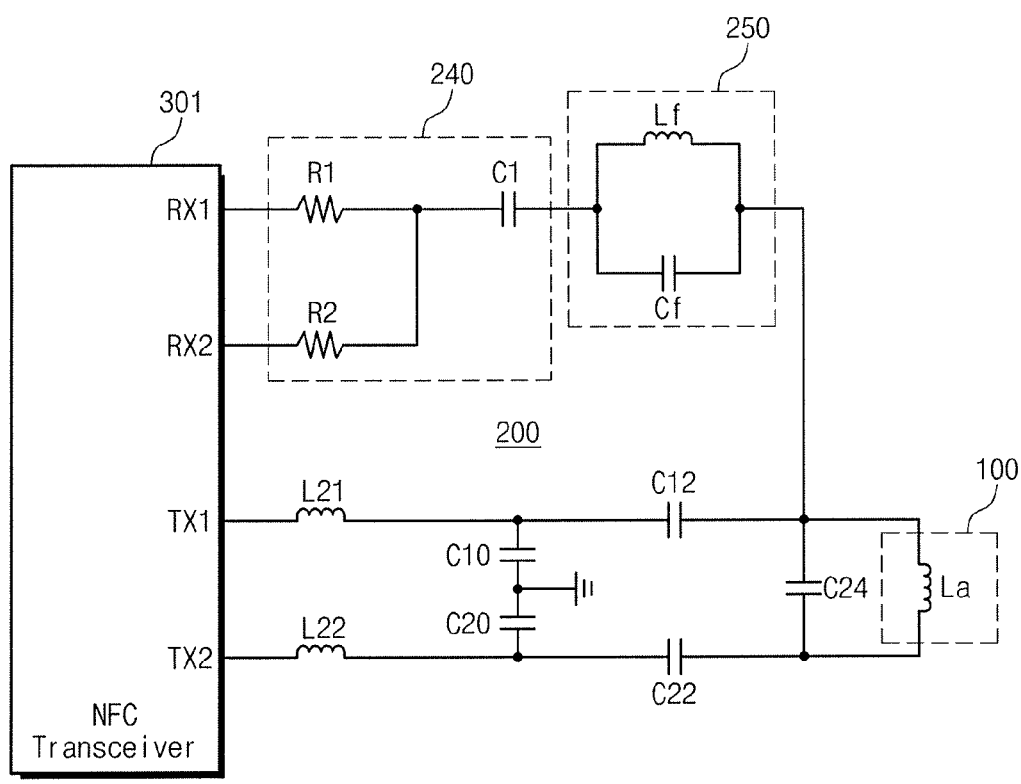
FIG. 6 is a circuit diagram schematically illustrating a matching and filtering circuit shown in FIG. 1, according to an exemplary embodiment of the inventive concept.

FIG. 6 is a circuit diagram schematically illustrating a matching and filtering circuit shown in FIG. 1, according to an exemplary embodiment of the inventive concept.

Referring to FIG. 6, a variable attenuator 250 of a matching and filtering circuit 200 contains an inductor Lf and a capacitor Cf that are connected in parallel between a capacitor C1 and one end of an antenna 100. Inductance of the inductor Lf may be set to have a range of 0.5 µH through 2 µH, and capacitance of the capacitor Cf may be set to have a range of 100 pF through 200 pF.

In FIG. 6, if an RC filter formed of the capacitor C1 and the resistor R1 is referred to as a first attenuator 240, an LC filter may be referred to as a second attenuator 250.

The RC filter is connected between a transceiver 301 and the variable attenuator 250 and attenuates a reception signal regardless of a frequency. The RC filter may be connected between a first receiver terminal RX1 of a receiver of the transceiver 301. The receiver of the transceiver 301 may be the receiver 310 of FIG. 2. The first attenuator 240 may include a resistor R2 connected to a second receiver terminal RX2 of the receiver and a node between resistor R1 and capacitor C1. The receiver may include additional receiver terminals and corresponding resistors connected in a similar manner to resistor R2.

Impedance of the LC filter, which acts as the second attenuator, varies with a frequency. That is, the variable attenuator 250 acts as a band stop filter which makes an attenuation ratio of reception data smaller than that of a reception carrier signal.

Like FIG. 2, inductors L21 and L22 and capacitors C10 and C20 that are connected between first and second transmission terminals TX1 and TX2 of a transmitter of transceiver 301 and the antenna 100 act as an EMC filter. The transmitter may be the transmitter 320 of FIG. 2. Capacitors C12, C22, and C24 that are connected between the first and second transmission terminals TX1 and TX2 of the transmitter of the transceiver 301 and the antenna 100 act as an impedance matching element.

During a reader mode, the transmitter of the transceiver 301 radiates a magnetic field with a predetermined transmission power through the antenna 100. An electronic device, RFID tag, or card in the radiated magnetic field is powered by power energy induced from the magnetic field and transmits internally stored data by means of a carrier signal. That is, a reception signal received through the antenna 100 may have the format that the reception data is modulated depending on the reception carrier signal.

A second attenuator, the variable attenuator 250 attenuates the reception signal. Since the variable attenuator 250 attenuates the reception signal varying with a frequency, an attenuation ratio of an RF carrier signal is different from that of reception data. That is, since the variable attenuator 250 has an attenuation characteristic in which impedance varies with a change in a frequency, reception data applied with a lower frequency −fd and an upper frequency +fd, which are spaced apart from the center frequency fc, is attenuated by 5% when a reception carrier signal applied with a center frequency fc of 13.56 MHz is attenuated by 70%.

The first attenuator 240 attenuates the reception signal attenuated by the variable attenuator 250. The first attenuator 240 attenuates the reception signal regardless of a frequency. However, an attenuation ratio of an RF carrier signal is equal to that of reception data. That is, since the first attenuator 240 has an attenuation characteristic in which impedance is fixed regardless of a change in a frequency, reception data applied with a lower frequency −fd and an upper frequency +fd, which are spaced apart from the center frequency fc, is also attenuated by 30% when a reception carrier signal applied with a center frequency fc of 13.56 MHz is attenuated by 30%.

Figure 7:
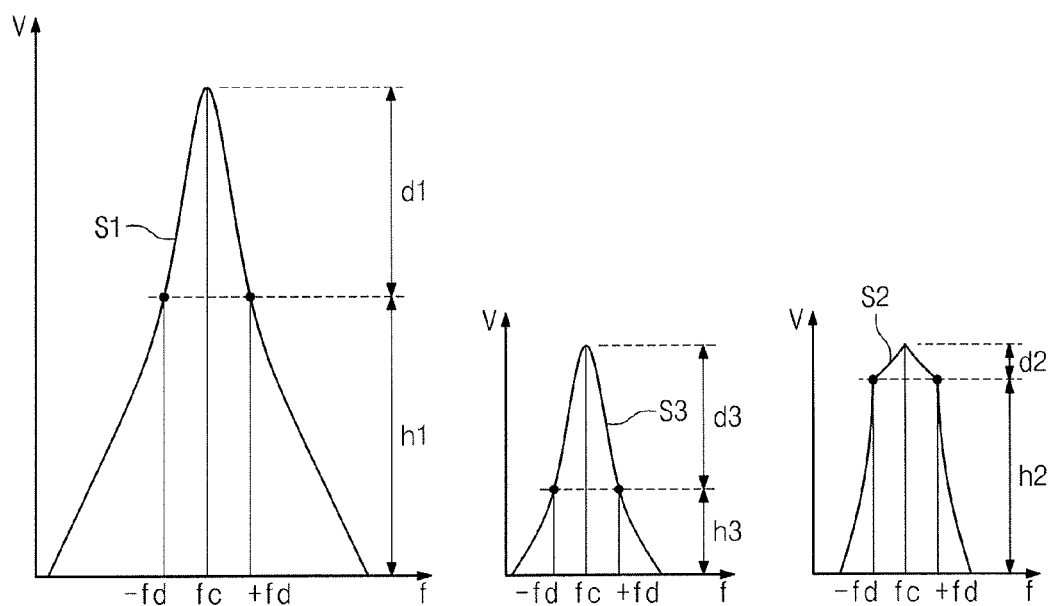
FIG. 7 is a diagram for describing attenuation of a reception signal by variable attenuators shown in FIGS. 3 through 5.

FIG. 7 is a diagram for describing attenuation of a reception signal by variable attenuators shown in FIGS. 3 through 5.

Referring to FIG. 7, a reception signal S1 is a signal received through an antenna 100, 'S3' indicates a resultant signal attenuated by a first attenuator 240, and 'S2' indicates a resultant signal attenuated by a variable attenuator 250. In FIG. 7, the abscissa represents a frequency, and the ordinate represents a voltage.

In the reception signal S1 received through the antenna 100, a reception carrier signal applied with a center frequency fc of 13.56 MHz includes reception data loaded on a lower frequency −fd and an upper frequency +fd, which are spaced apart from the center frequency fc by a predetermined frequency. In this case, the reception data has a voltage level of h1, and the reception carrier signal has a voltage level of (h1+d1).

Since the first attenuator 240 attenuates the reception signal S1 regardless of a frequency, an attenuation ratio of the reception carrier signal is equal to that of the reception data. The first attenuator 240 has an attenuation characteristic in which impedance is fixed regardless of a frequency. When the reception carrier signal applied with the center frequency fc of 13.56 MHz is attenuated as much as 60% (=d3/d1×100(%)), for example, the reception data is attenuated as much as 60% (=h3/h1×100(%)).

Meanwhile, now that the variable attenuator 250 attenuates the reception signal S1 variably with a frequency, an attenuation ratio of the reception carrier signal is different from that of the reception data. That is, since the variable attenuator 250 acts as a band stop filter having an attenuation characteristic in which impedance varies with a change in a frequency, the reception data is attenuated as much as 3% (=h2/h1×100(%)) when the reception carrier signal applied with the center frequency fc of 13.56 MHz is attenuated as much as 60% (=d2/d1×100(%)).

Figure 8:
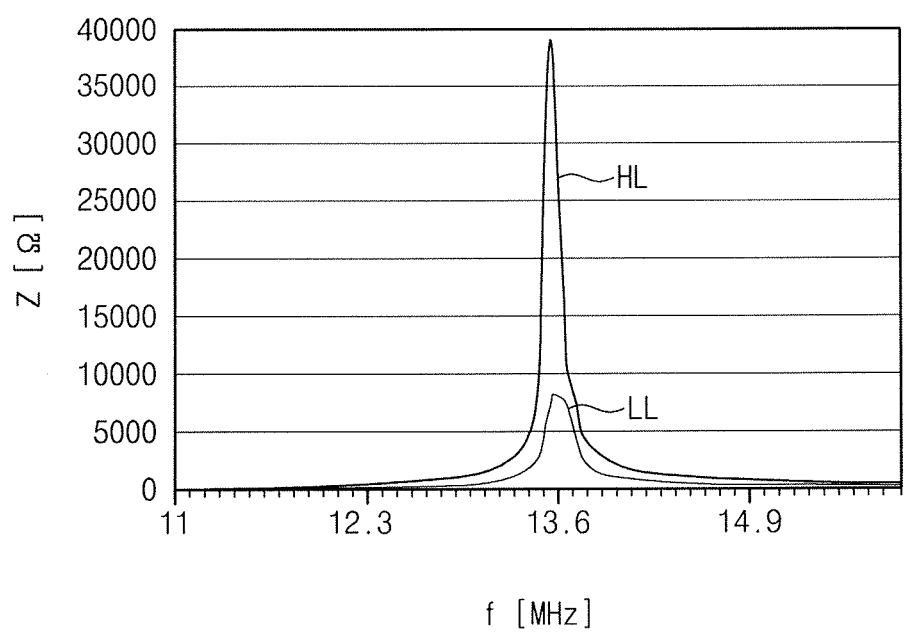
FIG. 8 is a diagram for describing a variation in impedance due to inductance of a variable attenuator, according to an exemplary embodiment of the inventive concept.

FIG. 8 is a diagram for describing a variation in impedance due to inductance of a variable attenuator, according to an exemplary embodiment of the inventive concept.

Referring to FIG. 8, the abscissa represents a frequency (MHz), and the ordinate represents impedance (Ω).

FIG. 8 shows an impedance variation when impedance of a variable attenuator 250 is great and when impedance of the variable attenuator 250 is small. As understood from a graph HL, impedance appearing at a center frequency fc of 13.56 MHz is over 37,000Ω when impedance of a variable attenuator 250 is great. Meanwhile, as understood from a graph LL, impedance appearing at the center frequency fc of 13.56 MHz is about 8,000Ω when impedance of a variable attenuator 250 is small.

Figure 9:
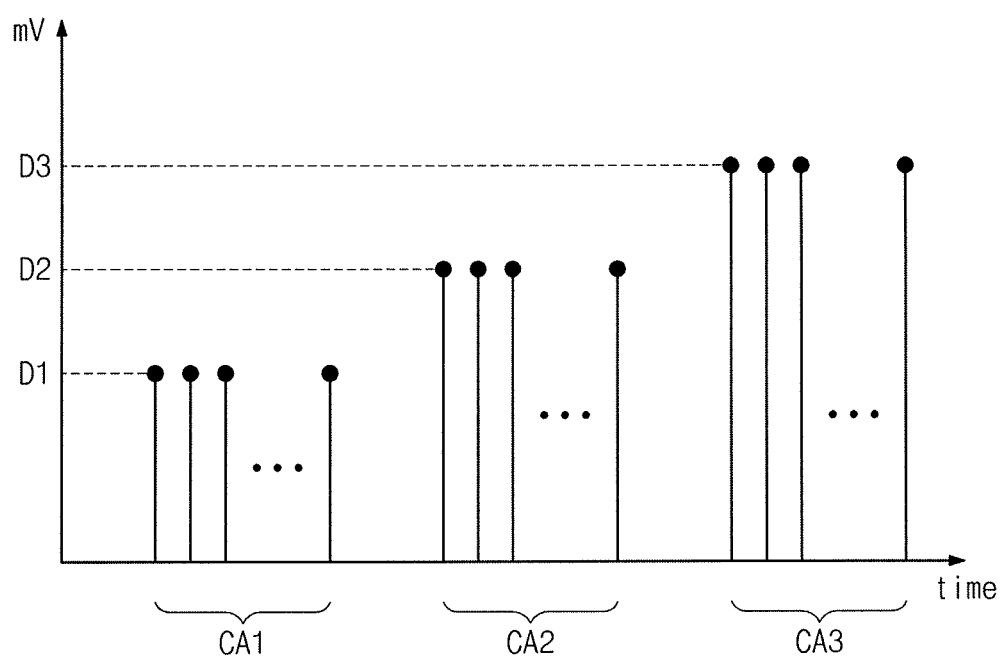
FIG. 9 is a diagram showing reception data obtained based on FIG. 8.

FIG. 9 is a diagram showing reception data obtained based on FIG. 8.

In FIG. 9, the abscissa represents a time, and the ordinate represents a voltage (mV). A first case CA1 shows the size of data D1 obtained when a reception signal is attenuated by a first attenuator 240 without using a variable attenuator 250.

A reception condition of a reception signal in a second case CA2 is the same as that in the first case CA1. The second case CA2 shows the size of data D2 obtained when a reception signal is attenuated by both the first attenuator 240 and the variable attenuator 250 having small impedance (refer to FIG. 2).

A reception condition of a reception signal in a third case CA3 is the same as that in the first case CA1. The third case CA3 shows the size of data D3 obtained when a reception signal is attenuated by both the first attenuator 240 and the variable attenuator 250 having great impedance (refer to FIG. 2).

It is understood from a measurement result that the data size D1, the data size D2, and the data size D3 are 32.5 mV, 51.0 mV, and 66.0 mV under the same condition. While the above describes the data sizes as having particular voltages, the inventive concept is not limited thereto.

In an exemplary embodiment, the variable attenuator 250 includes a first variable attenuator of a first impedance and a second variable attenuator of a second higher impedance, and the controller 260 is configured to applied a control signal to the variable attenuator that indicates which one of the two variable attenuators to enable and which to disable.

That is, it is understood from FIG. 9 that attenuation of reception data received through an antenna 100 is smaller than that of a reception carrier signal during a reader mode. Thus, a receiver 310 obtains reception data with a sufficient size without increasing a transmission power, thereby increasing a communication distance between the antenna 100 and an external terminal or tag and reducing a transmission power consumed when a magnetic field is radiated through the antenna 100.

Figure 10:
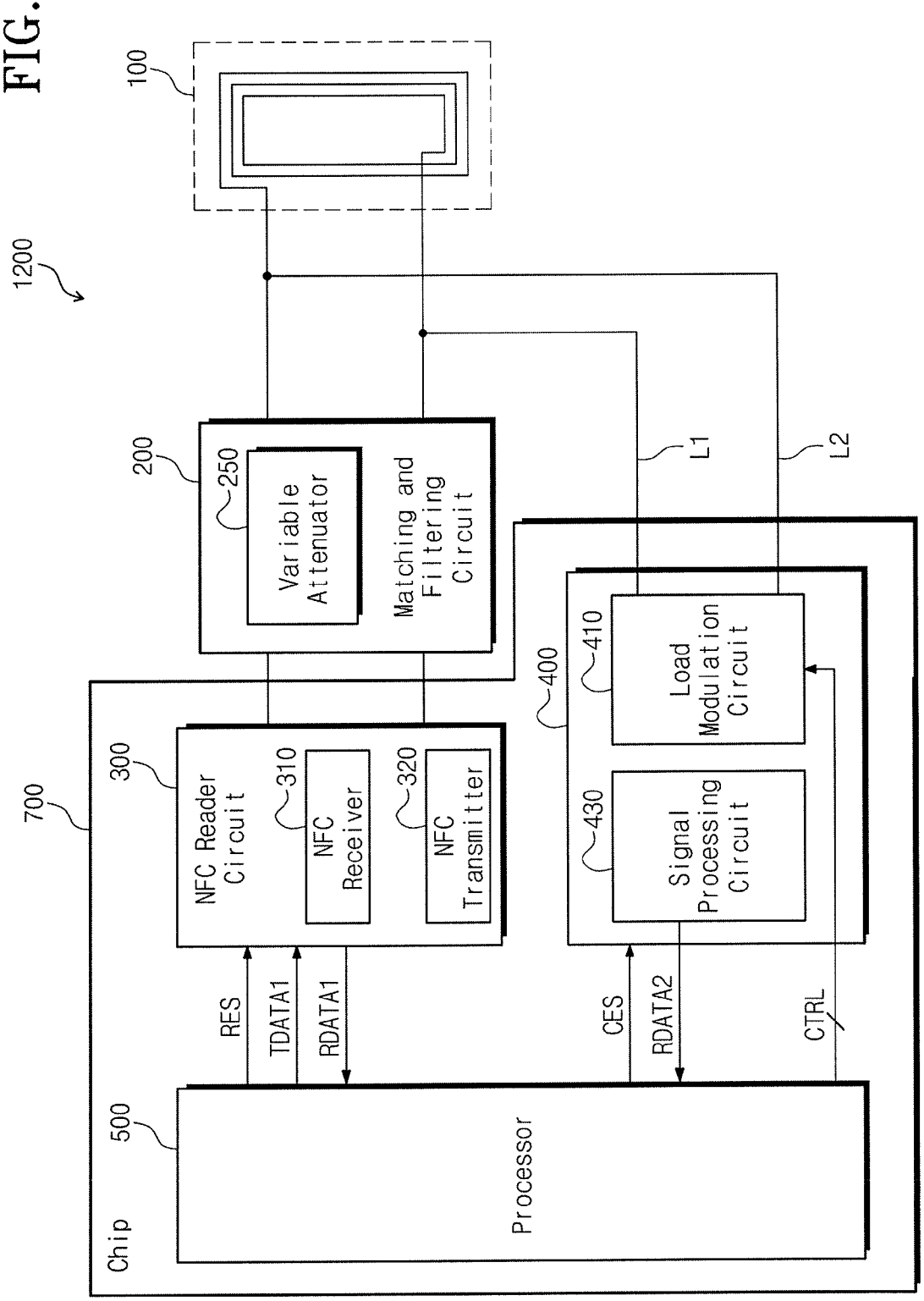
FIG. 10 is a block diagram showing an NFC system including a data transceiver device for near field communication shown in FIG. 1, according to an exemplary embodiment of the inventive concept.

FIG. 10 is a block diagram showing an NFC system including a data transceiver device for near field communication shown in FIG. 1, according to an exemplary embodiment of the inventive concept.

Referring to FIG. 10, an NFC system 1200 contains an antenna 100, a matching and filtering circuit 200, and an NFC processor chip 700.

The NFC processor chip 700 includes a transceiver 300 as an NFC reader circuit, an NFC card circuit 400, and a processor 500.

The antenna 100 provides a reception signal to the matching and filtering circuit 200 and the NFC card circuit 400. The antenna 100 transmits an output signal from the transceiver 300 or the NFC card circuit 400 to the exterior.

The matching and filtering circuit 200 adjusts a resonance frequency of the antenna 100 and conducts impedance matching between the transceiver 300 and the antenna 100.

The transceiver 300 communicates with an external NFC reader or tag through the antenna 100 while a reader enable signal RES is received from the processor 500. The transceiver 300 contains a receiver 310 and a transmitter 320, which are described with reference to FIG. 1.

The receiver 310 demodulates an RF signal received through the antenna 100, and the demodulated signal is provided to the processor 500 as reception data RDATA1.

The transmitter 320 modulates transmission data TDATA1 from the processor 500. The transmission data thus modulated is output through the antenna 100 as an RF signal.

Since a variable attenuator 250 of the matching and filtering circuit 200 varies an attenuation ratio differently with a frequency, an attenuation ratio of the reception data becomes smaller than that of a reception carrier signal.

Accordingly, during a reader mode, attenuation of the reception data received through an antenna 100 is smaller than that of the reception carrier signal. The attenuated reception signal is applied to the receiver 310. In this case, the receiver 310 obtains reception data with a sufficient size without increasing a transmission power, thereby increasing a communication distance between the antenna 100 and an external terminal or tag and reducing a transmission power consumed when a magnetic field is radiated through the antenna 100.

The NFC card circuit 400 connects to the antenna 100. The NFC card circuit 400 communicates with an external NFC reader (e.g., an NFC card) through the antenna 100 while a card enable signal CES is received from the processor 500. That is, the NFC card circuit 400 acts as an NFC tag during a passive mode.

The NFC card circuit 400 selectively connects a signal processing circuit 430 to lines L1 and L2 in response to a plurality of control signals CTRL, thereby making it possible to adjust a resonance frequency of the antenna 100. For example, since the NFC card circuit 400 adjusts a resistance value in response to the control signals CTRL, a resonance frequency of the antenna 100 is changed.

The NFC card circuit 400 contains a load modulation circuit 410 and the signal processing circuit 430. The load modulation circuit 410 modulates data to be transmitted to the exterior through the antenna 100 in response to the control signals CTRL while the NFC card circuit 400 is enabled. As the load modulation circuit 410 adjusts a resistance value in response to the control signals CTRL from the processor 500, a resonance frequency of the antenna 100 is changed.

As a resistance value of the load modulation circuit 410 is changed, a resonance frequency of the antenna 100 when the NFC card circuit 400 is enabled and a resonance frequency of the antenna 100 when the NFC reader circuit 300 is enabled are adjusted to be different from each other.

An exemplary embodiment, the signal processing circuit 430 demodulates an RF signal received through the antenna 100, and the demodulated signal is provided to the processor 500 as reception data RDATA2.

The variable attenuator 250 of FIG. 10 may be replaced with the attenuator 250a of FIG. 3 or the attenuator 250b of FIG. 4.

Figure 11:
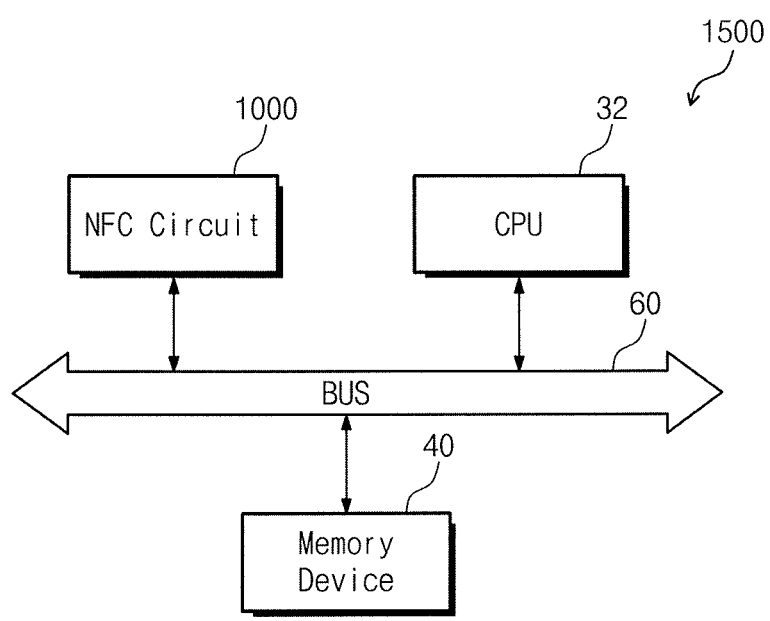
FIG. 11 is a block diagram schematically illustrating an electronic device including a data transceiver device for near field communication shown in FIG. 1, according to an exemplary embodiment of the inventive concept.

FIG. 11 is a block diagram schematically illustrating an electronic device including a data transceiver device for near field communication shown in FIG. 1, according to an exemplary embodiment of the inventive concept.

Referring to FIG. 11, an electronic device 1500 contains an NFC circuit 1000 described with reference to FIG. 1, a central processing unit (CPU) 32 connected to the NFC circuit 1000 through a bus 60, and a memory device 40 connected to the bus 60. The NFC circuit 1000 may include a variable attenuator described with reference to FIG. 1, thereby increasing a communication distance between an antenna and an external terminal or tag and reducing a transmission power consumed when a magnetic field is radiated through the antenna.

The bus 60 may comply with at least one of a variety of interface protocols, such as, but not limited to, a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol.

The memory device 40 stores data received from the NFC circuit 1000 in response to a control of the CPU 32.

The memory device 40 may be implemented with a nonvolatile memory device. The nonvolatile memory device may include various kinds of nonvolatile memory cells.

The nonvolatile memory cells may be formed of Electrically Erasable Programmable Read-Only Memory (EEPROM) cells, flash memory cells, MRAM (MRAM) cells, Spin-Transfer Torque MRAM (STT-MRAM) cells, CBRAM Conductive bridging RAM (CBRAM) cells, Ferroelectric RAM (FeRAM) cells, Phase change RAM (PRAM) cells referred to as Ovonic Unified Memory (OUM) cells, RRAM or Resistive RAM (ReRAM) cells, nanotube RRAM cells, Polymer RAM (PoRAM) cells, Nano Floating Gate Memory (NFGM) cells, holographic memory cells, molecular electronics memory cells, or insulator resistance change memory cells.

The electronic device shown in FIG. 11 may be provided as one of various components of an electronic device, such as a computer, a ultra-mobile personal computer (UMPC), a workstation, a net-book, a personal digital assistance (PDA), a portable computer (PC), a web tablet, a wireless phone, a mobile phone, a smart phone, a smart television, a three-dimensional television, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, storage as a data center, a device for transmitting and receiving information in a wireless environment, one of various electronic devices constituting a home network, one of various electronic devices constituting a computer network, one of various electronic devices constituting a telematics network, a radio frequency identification (RFID) device, or one of various components constituting a computing system.

Figure 12:
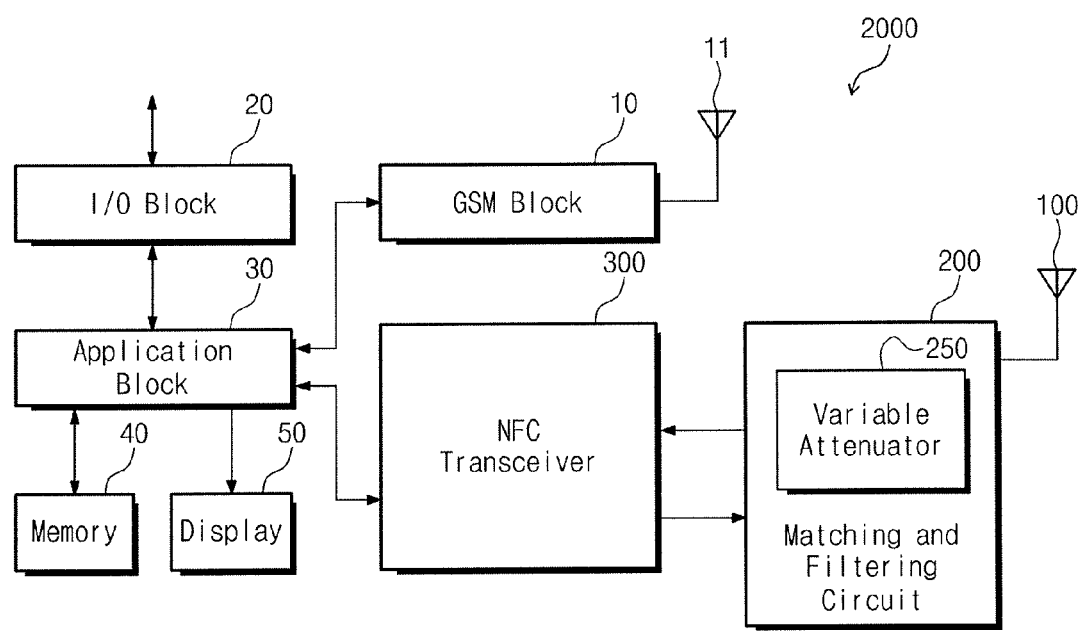
FIG. 12 is a block diagram schematically illustrating a mobile phone including a data transceiver device for near field communication shown in FIG. 1, according to an exemplary embodiment of the inventive concept.

FIG. 12 is a block diagram schematically illustrating a mobile phone including a data transceiver device for near field communication shown in FIG. 1, according to an exemplary embodiment of the inventive concept.

Referring to FIG. 12, a mobile phone 2000 contains a Global System for Mobile Communication (GSM) block 10, an input/output block 20, an application block 30, a memory 40, a display 50, and a Near Field Communication (NFC) transceiver 300.

Constituent elements/blocks of the mobile phone shown in FIG. 12 are only exemplary. However, the inventive concept is not limited thereto. For example, the mobile phone 2000 may include more or less constituent elements/blocks. While the GSM technique is used in the embodiment of FIG. 12, the inventive concept is not limited thereto. For example, the mobile phone 2000 may be implemented using other techniques such as a Code Division Multiple Access (CDMA) technique.

The blocks of FIG. 12 may be implemented in an integrated circuit (IC) form. Alternatively, some of the blocks may be implemented in an IC form, while other blocks may be in a discrete form.

The GSM block 10 is connected to an antenna 11 and operates to provide wireless telephone operations.

The NFC transceiver 300 transmits and receives NFC signals by means of inductive coupling for wireless communications.

The NFC transceiver 300 provides a transmission NFC signal to the matching and filtering circuit 200, and the matching and filtering circuit 200 transmits the transmission NFC signal to the antenna 100 through the inductive coupling.

The matching and filtering circuit 200 receives a reception NFC signal from an external device to send it to the NFC transceiver 300.

The NFC transceiver 300 operates consistent with specifications described in Near Field Communication Interface and Protocol-1 (NFCIP-1) and Near Field Communication Interface and Protocol-2 (NFCIP-2) and standardized in ECMA-340, ISO/IEC 18092, ETSI TS 102 190, ISO 21481, ECMA 352, ETSI TS 102 312, etc.

The application block 30 contains corresponding hardware circuitry (e.g., one or more processors) and operates to provide various user applications provided by the mobile phone 2000. The user applications may include voice call operations, data transfers, etc. The application block 30 may operate in conjunction with the GSM block 10 to provide such features.

The display 50 displays images in response to the corresponding display signals received from the application block 30. The images may be generated by a camera provided in mobile phone 2000, but not shown in FIG. 12. The display 50 may contain memory (e.g., a frame buffer) internally for temporary storage of pixel values for image refresh purposes and may be implemented, for example, as a liquid crystal display screen with associated control circuits.

The I/O block 20 may provide a user with the facility to provide inputs, for example, to dial numbers. In addition, the I/O block 20 may provide outputs that are received via the application block 30.

The memory 40 stores program (instructions) and/or data used by the applications block 30 and is implemented as RAM, ROM, flash memory, etc. Thus, the memory 40 may contain volatile as well as non-volatile storage elements.

Transmission and reception of NFC signals by the NFC transceiver 300 may be made in time division. For example, multiple NFC signals can be transmitted over a common signal path by alternating between transmitting different portions of the signals at different times. For example, multiple NFC signals can be received over the common signal path by interpreting portions of the signals received at different times as corresponding to a different one or part of the multiple signals.

In FIG. 12, a matching and filtering circuit 200 includes a variable attenuator 250 described with reference to FIG. 1. Since the variable attenuator 250 varies impedance with a frequency, attenuation of a reception data is smaller than that of a reception carrier signal. Thus, the mobile phone 2000 obtains reception data with a sufficient size without increasing a transmission power, thereby increasing an NFC communication distance of the mobile phone 2000 and reducing an NFC transmission power. The variable attenuator 250 in FIG. 12 may be replaced with attenuator 250*a* of FIG. 3 or attenuator 250*b* of FIG. 4.

Figure 13:
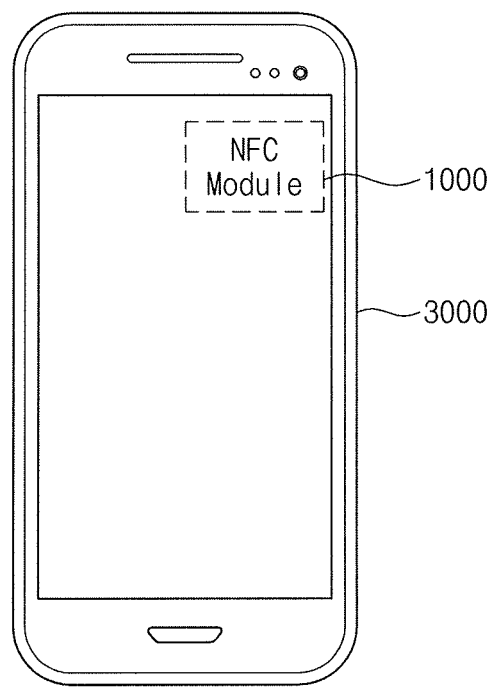
FIG. 13 is a diagram showing a mobile phone including a data transceiver device for near field communication shown in FIG. 1, according to an exemplary embodiment of the inventive concept.

FIG. 13 is a diagram showing a mobile phone including a data transceiver device for near field communication shown in FIG. 1, according to an exemplary embodiment of the inventive concept.

An NFC module 1000 is mounted in a mobile phone 3000, so the mobile phone 3000 acts as an NFC reader or an NFC card. The NFC module 1000 may include a variable attenuator 250 described with reference to FIG. 1, the attenuator 250*a* of FIG. 3, or the attenuator 250*b* of FIG. 4, thereby making it possible to reduce transmission power. This means that battery life of the mobile phone 3000 becomes relatively longer. Also, since the size of reception data becomes relatively greater, a communication distance between the mobile phone 3000 and an external device may increase.

At least one embodiment of the NFC reader or card may be used to exchange information such as address book files, game files, and MP3 file among mobile terminals and among various computers (e.g., a notebook computer, a tablet computer, a smartphone, etc.). This information may be transferred using an NFC standard of ISO 18092. At least one embodiment of the NFC card may be used in a transportation card or a credit card to exchange information for payment. Each mobile terminal may include an NFC system in the form of a chip that conducts data communications with an external terminal or card through the antenna. A frequency of a magnetic field radiated from the NFC system, amplitude modulation of the magnetic field at the active and passive modes, and demodulation for data transfer, may be defined by protocols such as ISO 14443-A and ISO 14443-B.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

While the above mainly describes an operation about a reader mode, the inventive concept is not limited thereto. In some cases, changes or modification on adjusting impedance variably with a frequency may be made by changing circuit components of drawings or adding or subtracting components without departing from the spirit and scope of the inventive concept. While an embodiment of the inventive concept exemplified as a band stop filter is applied to an NFC reader circuit, the inventive concept is not limited thereto. For example, an embodiment of the inventive concept may be applied to an NFC card circuit.

What is claimed is:

1. A data transceiver device for near field communication, the device comprising:
   an antenna;
   a transceiver including a receiver configured to demodulate a reception signal, received through the antenna, including reception data modulated by a reception carrier signal and a transmitter configured to transmit a transmission signal, obtained by modulating transmission data via a transmission carrier signal, through the antenna; and
   a circuit connected between the antenna and the transceiver and configured to perform filtering and impedance matching for the reception signal and the transmission signal,
   wherein the circuit includes a variable attenuator connected between the receiver and the antenna and configured to vary an attenuation ratio differently with a frequency such that an attenuation ratio of the reception data is smaller than that of the reception carrier signal,
   wherein the variable attenuator is an LC filter.

2. The data transceiver device of claim 1, wherein the variable attenuator is an analog filter.

3. The data transceiver device of claim 1, wherein the LC filter includes an inductor and a first capacitor connected in parallel between a second capacitor and a resistor.

4. The data transceiver device of claim 3, wherein an attenuation ratio defined by the second capacitor and the resistor is fixed such that an attenuation ratio of the reception data is equal to that of the reception carrier signal.

5. The data transceiver device of claim 1, wherein the LC filter includes an inductor and a first capacitor connected in series between a node and a ground voltage where the node is connected between a second capacitor and a resistor.

6. The data transceiver device of claim 1, wherein the data transceiver device uses 13.56 MHz as a frequency band.

7. The data transceiver device of claim 6, wherein the data transceiver device is included in a mobile terminal.

8. The data transceiver device of claim 1, wherein impedance of the variable attenuator varies with a frequency.

9. The data transceiver device of claim 8, wherein the variable attenuator is a band stop filter for blocking a frequency band of the reception carrier signal.

10. A data transceiver device for near field communication, the device comprising:
    an antenna;
    a transceiver including a receiver configured to demodulate a reception signal, received through the antenna, including reception data modulated by a reception carrier signal and a transmitter configured to transmit a transmission signal, obtained by modulating transmission data via a transmission carrier signal, through the antenna; and a circuit connected between the antenna and the transceiver and configured to perform filtering and impedance matching for the reception signal and the transmission signal, wherein the circuit includes:

a first attenuator connected between the receiver and the antenna and configured to attenuate the reception signal regardless of a frequency; and a second attenuator connected to the first attenuator, an impedance of the second attenuator varying with the frequency such that an attenuation ratio of the reception data is smaller than that of the reception carrier signal.

11. The data transceiver device of claim 10, wherein the first attenuator is an RC filter that includes a first capacitor and a resistor connected in series between the receiver and the antenna.

12. The data transceiver device of claim 11, wherein the second attenuator is an LC filter that includes an inductor and a second capacitor connected in parallel between the first capacitor and the resistor.

13. The data transceiver device of claim 11, wherein the second attenuator is a band stop filter that includes an inductor and a second capacitor connected in series between a node and a ground voltage, where the node is connected between the first capacitor and the resistor.

14. The data transceiver device of claim 13, wherein the band stop filter is a filter that blocks a frequency band of the reception carrier signal and passes the reception data.

15. A data transceiver for near field communication, the device comprising:

an antenna;

a transmitter;

a receiver configured to demodulate a reception signal, received through the antenna, including reception data modulated by a reception carrier signal;

a variable attenuator connected between the receiver and the antenna and configured to vary an attenuation ratio differently with a frequency such that an attenuation ratio of the reception data is smaller than that of the reception carrier signal;

an electromagnetic compatibility EMC filter connected between the transmitter and the antenna; and an RC filter comprising a resistor connected between the variable attenuator and a node of the EMC filter and a first capacitor connected between the receiver and the variable attenuator.

16. The data transceiver device of claim 15, wherein the variable attenuator comprises an inductor connected in parallel with a second capacitor between the first capacitor and the resistor.

17. The data transceiver device of claim 15, wherein the variable attenuator comprises an inductor connected in series between a second capacitor and a node, where the node is connected between the first capacitor and the resistor, and the second capacitor is connected to a ground voltage.

18. The data transceiver device of claim 15, wherein the variable attenuator comprises a second capacitor connected in series between a first inductor and a node, and a second inductor connected in a parallel with a third capacitor between the node and a ground voltage.

* * * * *